May 23, 1967     E. DURHAM     3,320,931

VAPOR GENERATING APPARATUS

Filed Feb. 2, 1961     3 Sheets-Sheet 1

INVENTOR.
Edwin Durham
BY
ATTORNEY

May 23, 1967 E. DURHAM 3,320,931
VAPOR GENERATING APPARATUS
Filed Feb. 2, 1961 3 Sheets-Sheet 3

INVENTOR.
Edwin Durham
BY
ATTORNEY

3,320,931
VAPOR GENERATING APPARATUS
Edwin Durham, Wadsworth, Ohio, assignor to The Babcock & Wilcox Company, New York, N.Y., a corporation of New Jersey
Filed Feb. 2, 1961, Ser. No. 86,741
2 Claims. (Cl. 122—7)

The present invention relates to vapor generating apparatus, and more particularly to a vapor generator periodically supplied with large volumes of high temperature gases containing entrained solid matter.

Some chemical and metallurgical processes periodically or cyclically evolve gases or fumes at high temperatures with or without entrained solids. When the gases contain fume or entrained solids, it is advantageous both from an economic and a nuisance standpoint to remove the fume and/or solids before the gases are discharged to the atmosphere. Since such gases usually are evolved at a high temperature, it may also be advantageous to recover heat from the gases and to use the heat for other purposes. Sometimes the temperature of the gases evolved are at a sufficiently high temperature that it is necessary to reduce the temperature thereof before effecting fume or solids removal therefrom.

A good example of the need for eliminating a nuisance and at the same time recovering economic heat values occurs during the treatment of steel by the use of an oxygen or air blast. One steel treatment unit of this type is the well known "L–D" process which utilizes a tilting vessel having an open upper end. Molten steel or iron is delivered to the vessel, the vessel is rotated about supporting trunnions so that its open end is in an upright position and the surface of the molten metal in the vessel is treated by a downwardly directed oxygen lance to burn off impurities and to reduce the carbon content of the metal. The effect of the oxygen lance is to increase the temperature of the molten metal and to evolve large volumes of high temperature gases containing large quantities of finely divided metal oxides which are entrained with the gases. The handling of such high temperature gases and the removal of the entrained fume and solids involves many difficulties in maintaining the walls of the ducts confining the flow of the gases to heat exchange surfaces.

In the present invention, one or more sources of hot gas, such as a steel converter of the type described, is provided with a fluid cooled duct or hood for directing the flow of the gases to an associated vapor generator. The hood or duct is provided with walls defined by closely spaced tubes, with at least some of the tubes connected into the circulatory system of the vapor generator. Advantageously, the hood or duct is constructed and arranged for removal of a panel of the tubes which forms a portion of one of the walls so as to provide a convenient access for maintenance of the converter. A closure member is also provided to close the hood and thereby eliminate gas flow when the hood is opened to facilitate maintenance of the converter. The lower end of the hood is outwardly diverging or bell-shaped and is closely spaced above the upper end of the converter with means provided for the injection of combustion air and steam into the lower end of the hood to aspirate the hot gases into the hood and to reduce exfiltration of gases outwardly through the annular gap between the converter and the end of the hood.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
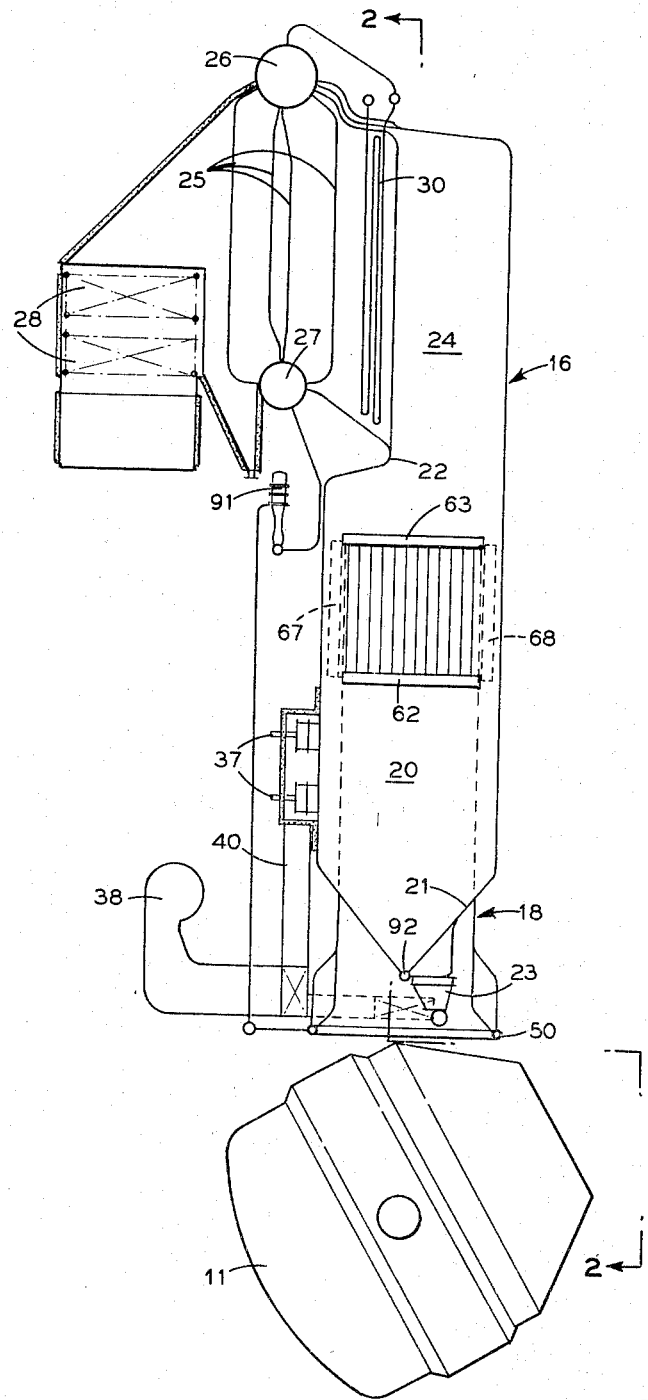
FIG. 1 is a side elevation, partly in section, of a vapor generator and a steel converter constructed and arranged in accordance with the present invention.

The invention is illustrated in the drawings as applied in the oxygen steel refining process, such as the "L–D" process, wherein a pair of open-mounted converters 10 and 11 of conventional pear-shape is utilized. Each converter is provided with an open end 12 and is supported on a pair of trunnions 13 and 14 which form a horizontal axis 15 to permit rotating or tilting the converter. The operation of such a steel refining converter is well known and includes the delivery of a molten charge to the converter while it is inclined, then tilting the converter to an upright position to effect the refining action of a jet of oxygen projected against the surface of the molten charge, and subsequently tilting the converter for discharge of the refined metal.

The reaction of the oxygen with the molten metal in the converter evolves large volumes of high temperature gases containing CO and are laden with dust and fumes. It is economically desirable to recover the entrained solids and to utilize both the sensible heat and the heat of combustion of the gases for useful purposes. To obtain removal of solids from the gases, it is necessary to reduce the gas temperatures from the 3300 to 3500 F. range leaving the converter to temperatures of the order of 500 to 700 F. entering, for example, an electrostatic dust collector. The reduction in the temperature of the gases can provide the means for generating steam in a boiler associated with the converter.

Figure 2:
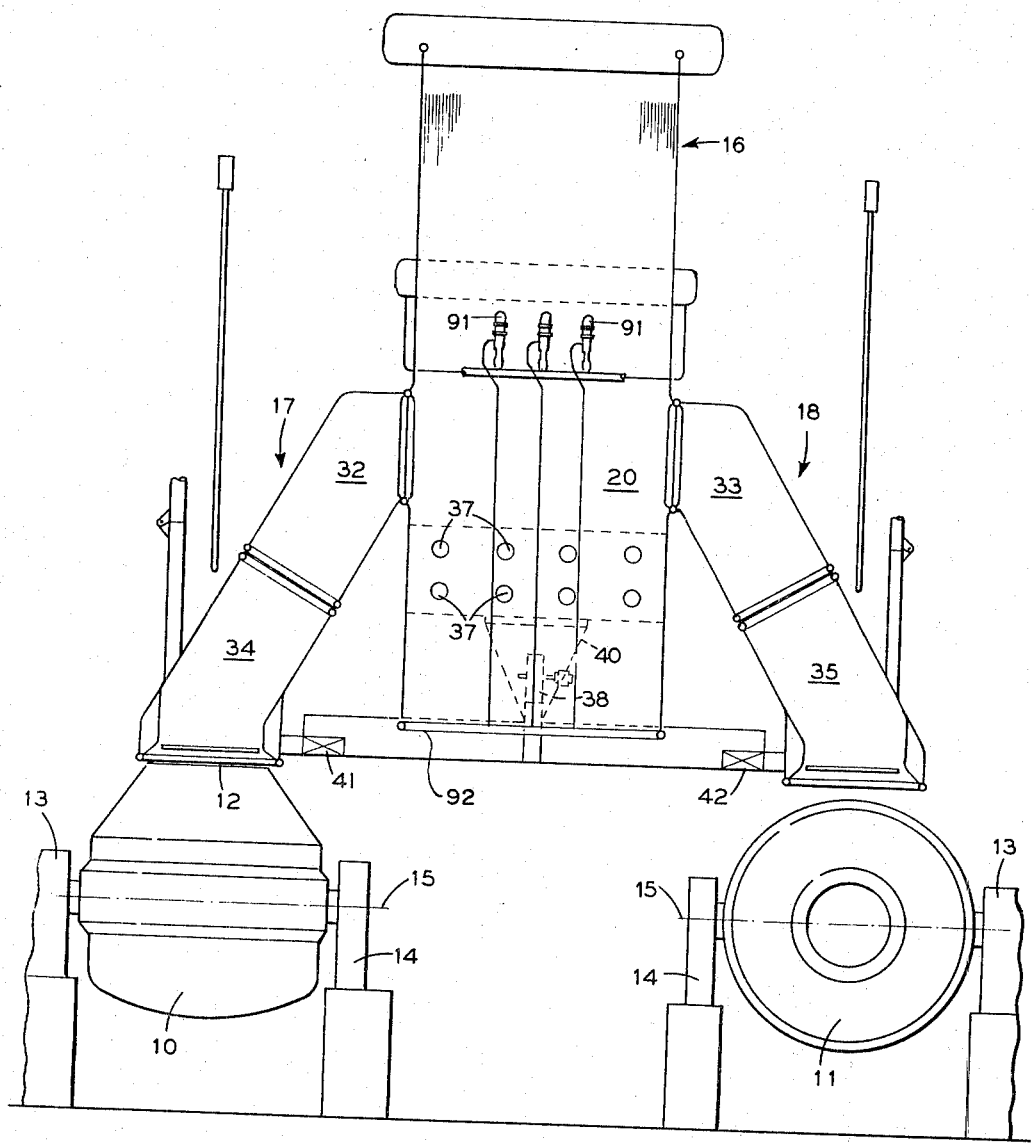
FIG. 2 is a front elevation of the structure shown in FIG. 1.

As shown in FIGS. 1 and 2, a single boiler unit 16 is connected with the pair of converters 10 and 11 by separate hoods 17 and 18, respectively. It is, of course, understood that a greater or lesser number of converters can be associated with a single boiler and still afford effective utilization of the heat and recovery of entrained solids within the scope of the invention. When a pair of converters is used, the usual procedure is to operate only one converter at a time while the other converter is down for maintenance, such as by replacement of the refractory lining of the converter. A typical operating campaign for converters of the type described entails the use of one converter for a week or ten days while the other converter is being relined. When the operating converter is shut down for maintenance, the other converter is then uitlized. Thus, only one of the converters, either 10 or 11, will be in service during any one period of time.

The operation of an oxygen steel-refining process utilizing a converter is cyclic and each cycle usually involves an overall time of from 45 minutes to an hour. The first part of the cycle is used for charging the converter with molten metal plus scrap or slag additions as desired. During this part of the cycle, the converter will be tilted at an angle of the order of 30° from the vertical. Thereafter, the converter is moved or tilted to an upright position with its outlet 12 opening upwardly. The oxygen refining portion of the cycle is then initiated, ordinarily lasting for a period from 20 to 25 minutes, and it is during this time that large volumes of high temperature gases are produced and then discharged from the converter. Following the refining portion of the cycle, the converter is tilted to a discharging position for the removal of the refined molten steel, and the cycle is subsequently repeated.

It will be observed, the operating cycle of an oxygen steel refining process imposes severe duty upon any associated vapor generating unit particularly in that extremely hot gases in large volumes are delivered to the vapor generator for only a fraction of the time during the operating cycle. During the remainder of the time, substantially no hot gases are delivered to the heat exchange surfaces. As a result of this cyclic heat exchange pattern, it is necessary to use forced fluid circulation to insure adequate, properly distributed flow of fluid within the vapor generator flow circuits.

In the present invention the hot gases discharged from a converter 10 are passed through the connecting hood 17. Connecting hood 18, in similar manner, serves converter 11. The hoods are constructed and arranged to receive the gases and to discharge them into a receiving chamber 20 associated with the vapor generator 16.

The chamber 20 is formed by rows of upright tubes arranged as boundary walls extending upwardly from a hopper bottom 21 to the elevation of a nose baffle 22. The hopper bottom 21 is provided with an offset collecting hopper 23 for accumulation of dust separated from the hot gases within the chamber, with the dust removed from the hopper 23 periodically or continuously, as desired. The tubes forming the side walls and front wall of the chamber 20 extend upwardly above the nose baffle 22 to define a gas turning vestibule 24 for directing gas flow horizontally over the convection banks 25 of generating tubes extending between upper and lower drums 26 and 27, respectively, of the vapor generator. Thereafter, the gases are directed downwardly over banks of economizer tubes 28 thence to dust removal apparatus such as an electrostatic precipitator (not shown). As shown in FIG. 1, a superheater 30 may be installed in the gas flow path leading through the convection banks of the vapor generator.

Figure 3:
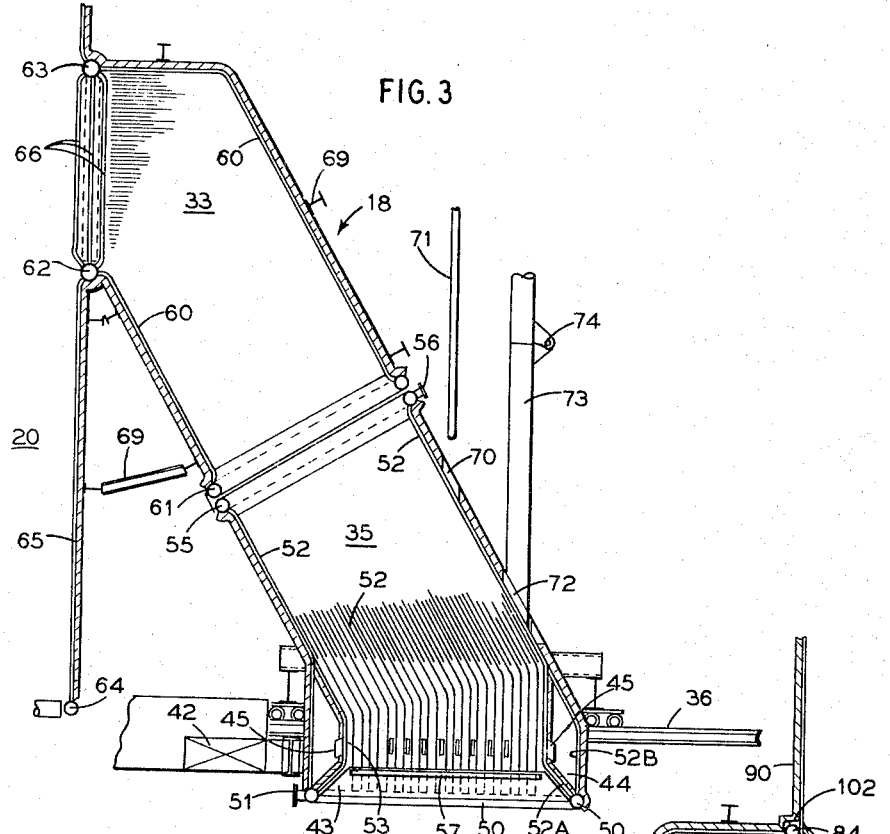
FIG. 3 is an enlarged sectional elevation of the hood connecting the vapor generator and steel converter shown in FIGS. 1 and 2.

As shown in FIGS. 1, 2 and 3, each of the connecting hoods 17 and 18 is constructed and arranged so that the upper portion 32 or 33, respectively, thereof is connected to the vapor generator support structure, and into the circulating system of the vapor generator. The lower portion 34 and 35 of each hood 17 and 18 is mounted on rails 36 so that it can be moved to one side to provide access for maintenance of the converter. The mobile lower portion of the hood is provided with a fluid flow circulation system which is independent of that of the boiler to minimize servicing incident to moving the hood. Preferably, the cooling system for the hood is of the closed circuit variety so that control of the cooling fluid purity may be attained.

As shown in the drawings, the lower portion of the chamber 20 is provided with a plurality of conventional oil and/or gas burners 37 for the introduction of a supplemental fuel into the chamber during the time when the converter is not discharging hot gas to the chamber. With this arrangement the boiler may be operated at a substantially constant steam output regardless of the cyclic operation of the converter. With oil and/or gas burners positioned in the chamber 20, combustion air is supplied to the burners from a forced draft blower 38 through a duct 40. Advantageously, a selected portion of the air discharged by the blower 38 is directed to the lower end portion of the hoods 17 and 18 through ducts 41 and 42, respectively, for injection into the gases discharging from the converter.

As shown particularly in FIG. 3, the lower portion 43 of the hood 18 is bell-shaped with a horizontally disposed annular header 50 defining the lower end thereof. The header is supplied with cooling fluid through an inlet connection 51, and delivers the fluid to riser tubes 52 which line the walls of the hood portion 35. Some of the riser tubes 52A leaving the header 50 are inclined inwardly and upwardly to define a throat 53 of square horizontal flow section, with the tubes thereafter extended upwardly and bent to define the inclined walls of the hood portion 35.

Other tubes 52B extend vertically upwardly from the header 50 being subsequently bent to merge in planar alignment with the tubes 52A to form the walls of the hood. The tubes 52 are inclined upwardly and toward the chamber 20 at an angle of approximately 60° from the horizontal and open to a common, continuous upper header 55 which is normal to the longitudinal axes of the tubes. The header 55 is provided with a fluid outlet 56 for discharge of the heated cooling fluid.

The intertube spaces between tubes 52A and 52B are gas tight and define the walls of a manifold 44 surrounding the throat 53 and lower end portion 43 of the hood. Air is delivered to the manifold 44 from the duct 42 and is discharged through a plurality of upwardly inclined air admission ports 45 positioned in the intertube spaces of the tubes forming the throat 53.

Steam jets having an upward velocity component may also be used to introduce steam into the lower portion of the hood, thereby assisting the air entering through the ports 45 in minimizing exfiltration of hot gases through the gap between the upper end of the converter and the hood. As shown in FIG. 3, this may be accomplished by an annular header 57 located beneath the throat 53 of the hood arranged with jets for discharging steam in an upward direction.

The outermost wall of the hood portion 35 is provided with an opening 70 for the accommodation of a vertically movable oxygen lance 71, and an opening 72 for a spout 73 through which solid materials, such as a flux or alloying agent, may be added to the metal in the converter 11. The spout 73 is hinged at 74 so that the hood portion may be readily removed as a unit from its operating position above the converter. Suitable means are provided for sealing the openings 70 and 72.

The upper portion 33 of the hood 18 is defined by tubes 60 forming the walls of the gas flow path through the hood, with the tubes being substantially co-planar with the tubes 52 in the walls of the lower portion 35 when the hood portions are in operative relationship. A fluid inlet header 61 opens to the lower ends of the tubes 60 with the headers 61 and 55 being in closely spaced parallel relationship. The upper end portions of the tubes 60 are bent to open into horizontally disposed headers 62 and 63 which are vertically spaced in the adjoining wall of the chamber 20. The header 62 not only receives fluid from the tubes 60 of the lower wall of the hood portion 33 but also receives fluid supplied to wall inlet header 64 for flow through tubes 65 in the adjacent wall of the chamber 20. The header 63 receives the fluid flowing through the tubes 60 of the upper wall of the hood portion 33, as well as fluid from the header 62 which passed through the screen tubes 66 and from upright headers 67 and 68 opening to the upper ends of the side wall tubes 60 (see FIG. 1).

The addition of air into the hood 18, in the manner described, performs a dual function. Due to the upward inclination of the air inlet ports 45, the air has a tendency to reduce leakage of gases between the upper end of the converter and the lower end of the hood. It is, of course, possible to provide a mechanical seal for this connection but due to the cyclic nature of the operation and the accompanying tilting movements of the converter, such a seal becomes complex, cumbersome and comparatively ineffective. It will also be understood that the gases leaving an oxygen steel refining converter will contain carbon monoxide gas which can readily be converted to carbon dioxide at the prevailing gas temperatures by the admission of air through the air inlet ports 45. Under these circumstances, it is to be understood that some combustion, due to the conversion of CO to $CO_2$, will occur in the hood.

As shown particularly in FIG. 3, the portion 33 of the hood 18 is supported from the chamber 20, and moves therewith during thermal changes of the vapor generator. The structural steel work connecting the hood portion 18 with the chamber 20 is indicated by the numeral 69. In the embodiment shown in FIGS. 1 and 2, the hoods 17 and 18 are of the same construction, but of opposite hand.

Figure 4:
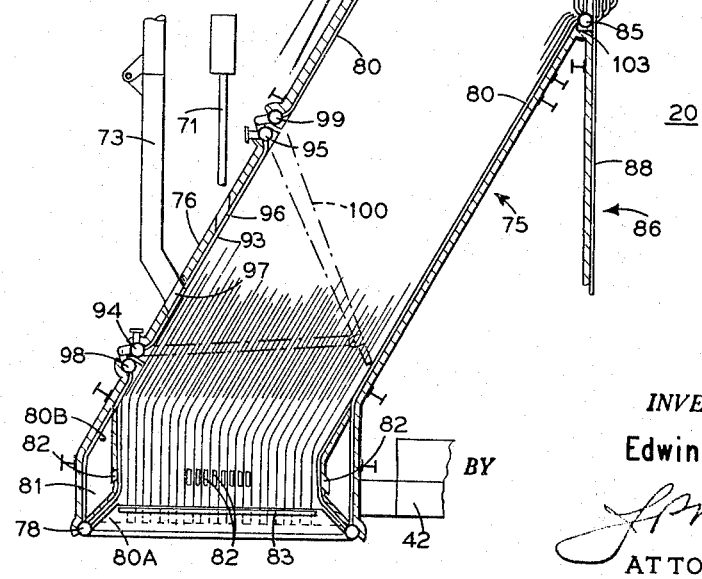
FIG. 4 is an enlarged elevation of a modified form of the hood shown in FIGS. 1 to 3, inclusive.

In the modified construction shown in FIG. 4, the hood 75 is of unitary construction and is supported independently of the chamber 20. A removable panel 76 is provided in a wall 77 of the hood for ready access to and maintenance of the converter. As shown, the hood 75 is constructed to substantially the same dimensions as the hoods 17 or 18 and can readily be substituted for the hood 17 without major design changes except for the inter-connection between the hood 75 and the wall of the chamber 20.

Referring to FIG. 4, an annular inlet header 78 is disposed in a horizontal plane to form the bell-like opening to the hood 75, and as in the FIG. 3 version of the hood construction, the header is spaced above the open upper end of the converter to receive the gases issuing therefrom. The walls of the hood, except for the removable panel portion, are defined by fluid cooling tubes 80 opening at their lower ends to the header 78, with the lower end portions 80A and 80B arranged to define an annular space or manifold 81 similar to that described in connection with FIG. 3. Upwardly directed air inlet ports 82 direct air from the manifold 81 into the gases rising through the hood 75 to convert the CO gases to $CO_2$ and to assist in preventing exfiltration of gases outwardly between the converter and the lower end of the hood 75. An annular header 83 may also be used to inject steam upwardly into the hood, as described in connection with the structure of FIG. 3.

The tubes 80 of the hood walls open to horizontally disposed headers 84 and 85 which are positioned outwardly adjacent the upper and lower confines of an opening 87 formed in the wall 86 of the chamber 20. The opening 87 is formed by displacing wall tubes 88 of the chamber wall 86 and omitting the refractory material 90 which encases the walls of the chamber 20 at this location. The headers 84 and 85 are interconnected by vertical headers (not shown) which open to the side wall tubes of the hood and are similar to the headers 67 and 68 shown in FIG. 1.

The header 78 receives cooling fluid, such as water, from the circulating system of the vapor generator with the heated fluid collected in the header 84 for discharge by risers (not shown) into the upper drum 26. As shown in FIGS. 1 and 2, pumps 91 withdraw water from the lower drum 27 and supply the cooling water to the headers of both of the hoods and to the lower header 92 of the chamber 20 for forced flow through the system.

The removable panel 76 in the wall 77 includes a row of tubes 93 extending between an inlet header 94 and an outlet header 95. Suitable openings 96 and 97 are provided in the panel 76 for the insertion of the oxygen lance 71 and the spout 73, each of which may be raised so that the panel 76 can be removed from the wall 77. Since some of the tubes 80 in the wall 77 are interrupted by the panel 76, those tubes end in a header 98 adjacent the header 94. A header 99 is also provided adjacent header 95 to supply water or other cooling fluid to the tubes 80 which are in alignment with the tubes 93 and which discharge into header 84. The headers 98 and 99 are flow connected on opposite sides of the panel 76 by tubular members (not shown) so that the panel may be removed without interfering with the forced flow through the tubes 80 in the wall 77.

With the removal of the panel 76, a pivoted closure member or baffle 100 is positioned to substantially close the gas flow passageway through the hood 75. When not in use, the baffle is rotated, as shown at 100′ in FIG. 4, to rest on the exterior surface of the wall 77, above the location of the panel 76.

Since the hood shown in the modification of FIG. 4 is supported independently of the vapor generator, the headers 84 and 85 are loosely enclosed within a refractory chamber 102 and 103, respectively, formed in the wall of the chamber 20. With this construction, the headers 84 and 85 of the hood are permitted relative vertical movement with respect to the wall of the chamber, as such movement occurs due to thermal changes. With such relative movements, the gas flow from each hood to the chamber 20 of the vapor generator will be maintained without leakage to the exterior of the unit.

As an example of the operation of the unit described, a steel converter of the type described having a steel refining capacity of 210 tons per charge will release heat at a rate approximately 750,000,000 B.t.u. per hour during the oxygen refining period of a cycle. The gas flow rate will be of the order of 875,000 per hour during this period, with the gases at a temperature in excess of 3000 F. Under these conditions, the vapor generator must be capable of producing steam at a rate of 540,000 pounds per hour, even though this rate of production may occur during, for example, only 15 minutes during a cycle time of 45 minutes.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for confining the flow of high temperature gases said apparatus including an oxygen-steel converter vessel having a gas discharge opening in its upper end, walls including fluid cooled tubes forming a flow passageway for said gases having a gas inlet at one end and a gas outlet at its other end, fluid inlet header means positioned super-adjacent the gas discharge opening of said vessel and connected with the lower ends of said tubes and defining the gas inlet end of said passageway, fluid outlet header means connected with the upper ends of said tubes and defining the gas outlet end of said passageway, and means for providing free access from the exterior of the apparatus and to the gas discharge opening of said converter including means defining an access opening in one of the side walls of said passageway directly to the atmosphere and in general alignment with the gas discharge opening of said converter when the converter is in its gas discharge position, a movable panel arranged to normally close said access opening, and means for fluid cooling said panel.

2. Apparatus for confining the flow of high temperature gases, said apparatus including an oxygen-steel converter vessel having a gas discharge opening in its upper end, walls including fluid cooled tubes forming a flow passageway for said gases having a gas inlet at one end and a gas outlet at its other end, fluid inlet header means positioned superadjacent the gas discharge opening of said vessel and connected with the lower ends of said tubes and defining the gas inlet end of said passageway, fluid outlet header means connected with the upper ends of said tubes and defining the gas outlet end of said passageway, and means for providing free access from the exterior of the apparatus and to the gas discharge opening of said converter including means defining an access opening in one of the side walls of said passageway and in general alignment with the gas discharge opening of said converter when the converter is in its gas discharge position, a movable panel arranged to normally close said access opening, and means for fluid cooling said panel including fluid inlet and outlet headers connected by tubes positioned in said panel.

(References on following page)

References Cited by the Examiner

UNITED STATES PATENTS

| | | | |
|---|---|---|---|
| 2,007,540 | 7/1935 | La Mont | 122—235 X |
| 2,360,855 | 10/1944 | Dow et al. | 122—49 |
| 2,831,467 | 4/1958 | Guczky | 122—7 |
| 2,862,701 | 12/1958 | McFeaters | 266—35 |

FOREIGN PATENTS

| | | |
|---|---|---|
| 366,495 | 7/1906 | France. |
| 972,340 | 8/1956 | Germany. |
| 1,063,191 | 8/1959 | Germany. |
| 1,071,093 | 12/1959 | Germany. |
| 571,016 | 12/1957 | Italy. |

KENNETH W. SPRAGUE, *Primary Examiner.*

ALDEN D. STEWART, FREDERICK L. MATTESON, JR., PERCY L. PATRICK, ROBERT A. O'LEARY, *Examiners.*

D. G. BLACKHURST, *Assistant Examiner.*